(No Model.) 2 Sheets—Sheet 2.

J. F. THEURER.
APPARATUS FOR EXTRACTING LUPULINE FROM HOPS.

No. 413,982. Patented Oct. 29, 1889.

Witnesses
Geo. W. Young.
N. E. Oliphant.

Inventor
J. Fnd Theurer
By Finot Underwood
Attorneys

UNITED STATES PATENT OFFICE.

JACOB FRED. THEURER, OF MILWAUKEE, WISCONSIN.

APPARATUS FOR EXTRACTING LUPULINE FROM HOPS.

SPECIFICATION forming part of Letters Patent No. 413,982, dated October 29, 1889.

Application filed April 14, 1888. Serial No. 270,684. (No model.)

*To all whom it may concern:*

Be it known that I, JACOB FREDRICK THEURER, of Milwaukee, in the county of Milwaukee, and in the State of Wisconsin, have invented certain new and useful Improvements in Apparatus for Extracting Lupuline from Hops; and I do hereby declare that the following is a full, clear, and exact description thereof.

My invention relates to apparatus for steeping and extracting the lupuline or bitter principle from hops, and will be fully described hereinafter.

Figure 1:
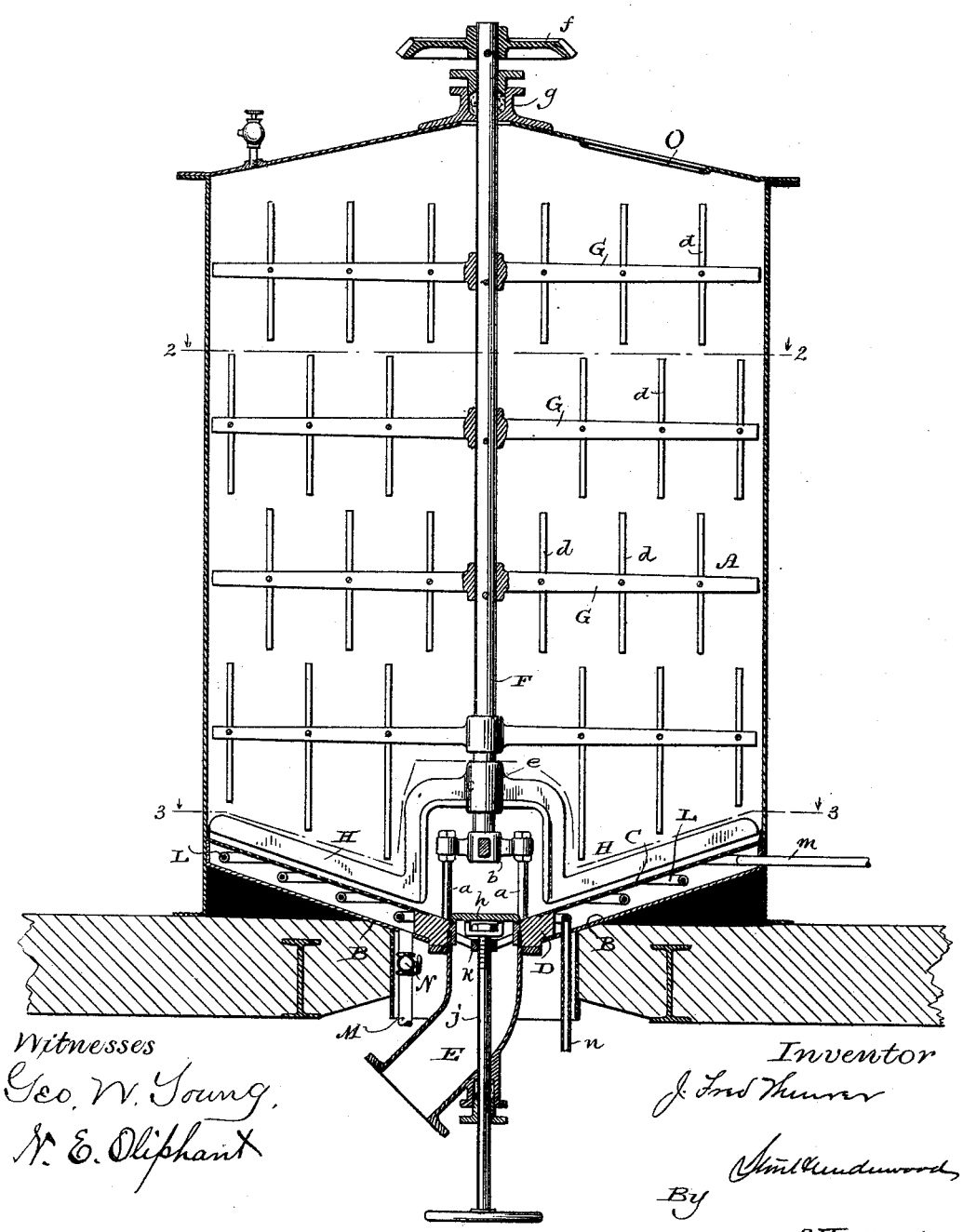
Figure 2:
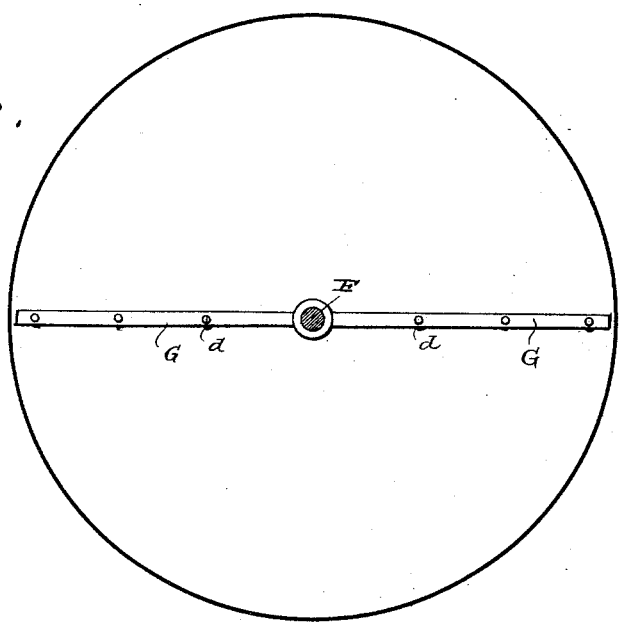
Figure 3:
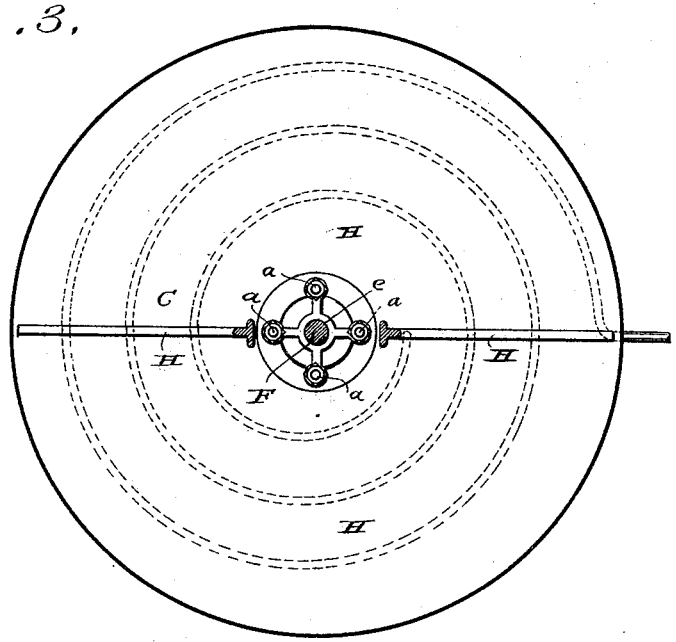

In the drawings, Figure 1 is a central vertical section of my apparatus. Fig. 2 is a section on line 2 2, Fig. 1, and Fig. 3 is a section on line 3 3, Fig. 1.

A is a tank, which has a slanting bottom B and an inclined perforated false bottom C, the inner edges of the two bottoms joined by an annulus D, which forms a central discharge-opening, from which a pipe E depends. The annulus D also forms a support for legs $a$ of a spider $b$, in the hub of which is stepped an upright shaft F, and this shaft carries radial arms G, that in turn carry vertical fingers $d$. The shaft F also carries a lower set of arms H, which arms H are without fingers, but are hung from a hub $e$, near the lower end of said shaft H, in position to travel in a plane parallel to the false bottom. Shaft F is connected by a bevel-wheel $f$ with any suitable source of power for revolving it, and has its upper bearing in a stuffing-box $g$ in the tank-cover.

The discharge-opening in annulus D is closed when desired by a valve $h$, the stem $j$ of which is screw-threaded and has its upper bearing in a cross-piece $k$, in an opening which is screw-threaded to receive it.

A steam or hot-air coil L is arranged between the bottoms B and C, its inlet $m$ leading from any suitable source of supply and its outlet $n$ leading down through the bottom B.

In addition to the discharge-pipe E a discharge-pipe M, having a suitable cut-off valve N, leads out from the bottom B, and this is to receive the lupuline extract as it is drained through the perforated false bottom.

In operation the hops are first placed in the tank through a man-hole O, and then the beer-liquor is let into the tank either through the man-hole or an opening especially to admit the hose or other pipe that conveys the liquor. Steam is let into the coil L and the shaft F started. Now, while the liquor is steeping through the hops the fingers $d$ will stir them up, and without tearing the leaves will separate them from each other and expose their entire surfaces to the action of the liquor, while the arms H will prevent the leaves from packing on the false bottom.

The man-hole cover is secured tightly in its seat to prevent the escape of the hops' flavor.

While I have described my process of extracting lupuline incidentally in connection with the apparatus which forms the subject-matter of this application, I do not herein claim said process, reserving the same as the subject-matter of a separate application filed by me in the United States Patent Office on August 20, 1888, under Serial No. 283,258.

Having thus fully described my invention, what I claim as new, and desire to secure by Letters Patent, is—

1. The combination, in a tank for steeping hops and extracting the lupuline therefrom, of a revolving shaft, and radial arms carried thereby and having vertical fingers, a perforated false bottom, a draining-pipe leading from the space beneath the false bottom, and heating-pipes located in said space, substantially as described.

2. The combination, in a steeping-tank, of an inclined perforated false bottom, a vertical shaft stepped therein, and arms carried by the shaft in a plane parallel with that of the false bottom and in near proximity to it, a central outlet for the tank, and a separate outlet for the fluid that drains through the false bottom, both outlets controlled by suitable valves, substantially as set forth.

3. The combination, in a steeping-tank for hops, of a vertical shaft, radial arms carried thereby and having vertical fingers, a set of inclined arms also carried by the said vertical shaft, a perforated false bottom, a pipe for draining the space beneath the false bottom, a heating-coil located in said space, a central outlet for the tank, and a valve for closing the same, substantially as described.

In testimony that I claim the foregoing I have hereunto set my hand, at Milwaukee, in the county of Milwaukee and State of Wisconsin, in the presence of two witnesses.

J. FRED. THEURER.

Witnesses:
CHAS. G. HOFFMANN,
S. S. STOUT.